(12) United States Patent
Haga et al.

(10) Patent No.: US 10,963,190 B2
(45) Date of Patent: Mar. 30, 2021

(54) MEMORY SYSTEM

(71) Applicant: TOSHIBA MEMORY CORPORATION, Tokyo (JP)

(72) Inventors: Takuya Haga, Yokohama Kanagawa (JP); Shuichi Watanabe, Fujisawa Kanagawa (JP)

(73) Assignee: TOSHIBA MEMORY CORPORATION, Tokyo (JP)

(*) Notice: Subject to any disclaimer, the term of this patent is extended or adjusted under 35 U.S.C. 154(b) by 40 days.

(21) Appl. No.: 16/549,451

(22) Filed: Aug. 23, 2019

(65) Prior Publication Data

US 2020/0301609 A1 Sep. 24, 2020

(30) Foreign Application Priority Data

Mar. 19, 2019 (JP) .............................. JP2019-050674

(51) Int. Cl.
| | | |
|---|---|---|
| *G06F 12/00* | (2006.01) | |
| *G06F 13/00* | (2006.01) | |
| *G06F 13/28* | (2006.01) | |
| *G06F 3/06* | (2006.01) | |
| *G06F 13/16* | (2006.01) | |

(52) U.S. Cl.
CPC .......... *G06F 3/0659* (2013.01); *G06F 3/0604* (2013.01); *G06F 3/0638* (2013.01); *G06F 3/0656* (2013.01); *G06F 3/0679* (2013.01); *G06F 13/1673* (2013.01)

(58) Field of Classification Search
CPC .... G06F 3/0604; G06F 3/0656; G06F 3/0659; G06F 13/1673
USPC ......................................................... 711/154
See application file for complete search history.

(56) References Cited

U.S. PATENT DOCUMENTS

| | | |
|---|---|---|
| 7,620,749 B2 | 11/2009 | Biran |
| 8,683,126 B2 | 3/2014 | Kanuri |
| 2016/0371034 A1* | 12/2016 | Kang .................. G06F 12/0615 |

FOREIGN PATENT DOCUMENTS

JP  2009-065564 A  3/2009

* cited by examiner

*Primary Examiner* — Edward J Dudek, Jr.
*Assistant Examiner* — Sidney Li
(74) *Attorney, Agent, or Firm* — Foley & Lardner LLP

(57) ABSTRACT

A memory system includes a semiconductor storage device and a memory controller. The memory controller includes a command buffer and a descriptor buffer. The memory controller stores a first command received from outside in the command buffer, fetches a first descriptor from the host device, based on the stored first command, stores the fetched first descriptor in the descriptor buffer, stores a second command received from the outside in the command buffer, discards an unused part of the first descriptor from the descriptor buffer, fetches a second descriptor from the host device, based on the stored second command, and stores the fetched second descriptor at an address where the discarded part of the first descriptor was stored.

15 Claims, 14 Drawing Sheets

FIG. 10

BUFFER RELEASE OPERATION BASED ON NUMBER OF DESCRIPTORS (IN CASE OF PRP)

(1) BUFFER IS FULL  (3) RELEASE BUFFER  (5) PERFORM OPERATION BASED ON CMD2, CMD2_D0, AND CMD2_D1

| | | TRANSMISSION AMOUNT |
|---|---|---|
| DB0 | CMD0_D0 | 4KB |
| DB1 | CMD0_D1 | 4KB |
| DB2 | CMD0_D2 | 4KB |
| DB3 | CMD0_D3 | 4KB |
| DB4 | CMD0_D4 | 4KB |
| DB5 | CMD1_D0 | 4KB |
| DB6 | CMD1_D1 | 4KB |
| DB7 | CMD1_D2 | 4KB |

(2) RECEIVE CMD2

| | | TRANSMISSION AMOUNT |
|---|---|---|
| DB0 | CMD0_D0 | 4KB |
| DB1 | CMD0_D1 | 4KB |
| DB2 | CMD0_D2 | 4KB |
| DB3 | Empty | |
| DB4 | Empty | |
| DB5 | CMD1_D0 | 4KB |
| DB6 | CMD1_D1 | 4KB |
| DB7 | CMD1_D2 | 4KB |

(4) TRANSMIT DESCRIPTOR BASED ON CMD2

| | | TRANSMISSION AMOUNT |
|---|---|---|
| DB0 | CMD0_D0 | 4KB |
| DB1 | CMD0_D1 | 4KB |
| DB2 | CMD0_D2 | 4KB |
| DB3 | CMD2_D0 | 4KB |
| DB4 | CMD2_D1 | 4KB |
| DB5 | CMD1_D0 | 4KB |
| DB6 | CMD1_D1 | 4KB |
| DB7 | CMD1_D2 | 4KB |

FIG. 12

BUFFER RELEASE OPERATION BASED ON NLB (IN CASE OF SGL)

(1) BUFFER IS FULL　　(3) RELEASE BUFFER　　(5) PERFORM OPERATION BASED ON CMD2, CMD2_D0, AND CMD2_D1

| | | TRANSMISSION AMOUNT |
|---|---|---|
| DB0 | CMD0_D0 | 1KB |
| DB1 | CMD0_D1 | 1KB |
| DB2 | CMD0_D2 | 1KB |
| DB3 | CMD0_D3 | 1KB |
| DB4 | CMD0_D4 | 1KB |
| DB5 | CMD1_D0 | 32KB |
| DB6 | CMD1_D1 | 4KB |
| DB7 | CMD1_D2 | 4KB |

(2) RECEIVE CMD2

| | | TRANSMISSION AMOUNT |
|---|---|---|
| DB0 | CMD0_D0 | 1KB |
| DB1 | CMD0_D1 | 1KB |
| DB2 | CMD0_D2 | 1KB |
| DB3 | CMD0_D3 | 1KB |
| DB4 | CMD0_D4 | 1KB |
| DB5 | CMD1_D0 | 32KB |
| DB6 | Empty | 4KB |
| DB7 | Empty | 4KB |

(4) TRANSMIT DESCRIPTOR BASED ON CMD2

| | | TRANSMISSION AMOUNT |
|---|---|---|
| DB0 | CMD0_D0 | 1KB |
| DB1 | CMD0_D1 | 1KB |
| DB2 | CMD0_D2 | 1KB |
| DB3 | CMD0_D3 | 1KB |
| DB4 | CMD0_D4 | 1KB |
| DB5 | CMD1_D0 | 32KB |
| DB6 | CMD2_D0 | 16KB |
| DB7 | CMD2_D1 | 8KB |

FIG. 13

BUFFER RELEASE OPERATION BASED ON COMMAND TYPE (1) BUFFER IS FULL

| | | COMMAND |
|---|---|---|
| DB0 | CMD0_D0 | Write |
| DB1 | CMD0_D1 | Write |
| DB2 | CMD0_D2 | Write |
| DB3 | CMD0_D3 | Write |
| DB4 | CMD0_D4 | Write |
| DB5 | CMD1_D0 | Read |
| DB6 | CMD1_D1 | Read |
| DB7 | CMD1_D2 | Read |

(2) RECEIVE CMD2

(3) RELEASE BUFFER

| | | COMMAND |
|---|---|---|
| DB0 | CMD0_D0 | Write |
| DB1 | CMD0_D1 | Write |
| DB2 | CMD0_D2 | Write |
| DB3 | Empty | |
| DB4 | Empty | |
| DB5 | CMD1_D0 | Read |
| DB6 | CMD1_D1 | Read |
| DB7 | CMD1_D2 | Read |

(4) TRANSMIT DESCRIPTOR BASED ON CMD2

(5) PERFORM OPERATION BASED ON CMD2, CMD2_D0, AND CMD2_D1

| | | COMMAND |
|---|---|---|
| DB0 | CMD0_D0 | Write |
| DB1 | CMD0_D1 | Write |
| DB2 | CMD0_D2 | Write |
| DB3 | CMD2_D0 | Read |
| DB4 | CMD2_D1 | Read |
| DB5 | CMD1_D0 | Read |
| DB6 | CMD1_D1 | Read |
| DB7 | CMD1_D2 | Read |

MEMORY SYSTEM

CROSS-REFERENCE TO RELATED APPLICATION(S)

This application is based upon and claims the benefit of priority from Japanese Patent Application No. 2019-050674, filed Mar. 19, 2019, the entire contents of which are incorporated herein by reference.

FIELD

Embodiments described herein relate generally to a memory system.

BACKGROUND

A NAND type flash memory capable of storing data in a non-volatile manner is known.

Examples of related art include Japanese Patent No. 4939443, JP-A-2009-065564, and U.S. Pat. No. 8,683,126.

DESCRIPTION OF THE DRAWINGS

FIG. 10 is a schematic diagram showing an example of the buffer release operation based on the number of descriptors in the memory system according to at least one embodiment;

FIG. 12 is a schematic diagram showing an example of the buffer release operation based on the number of logical blocks (NLB) in the memory system according to at least one embodiment;

FIG. 13 is a schematic diagram showing an example of the buffer release operation based on a command type in the memory system according to at least one embodiment.

DETAILED DESCRIPTION

Figure 1:
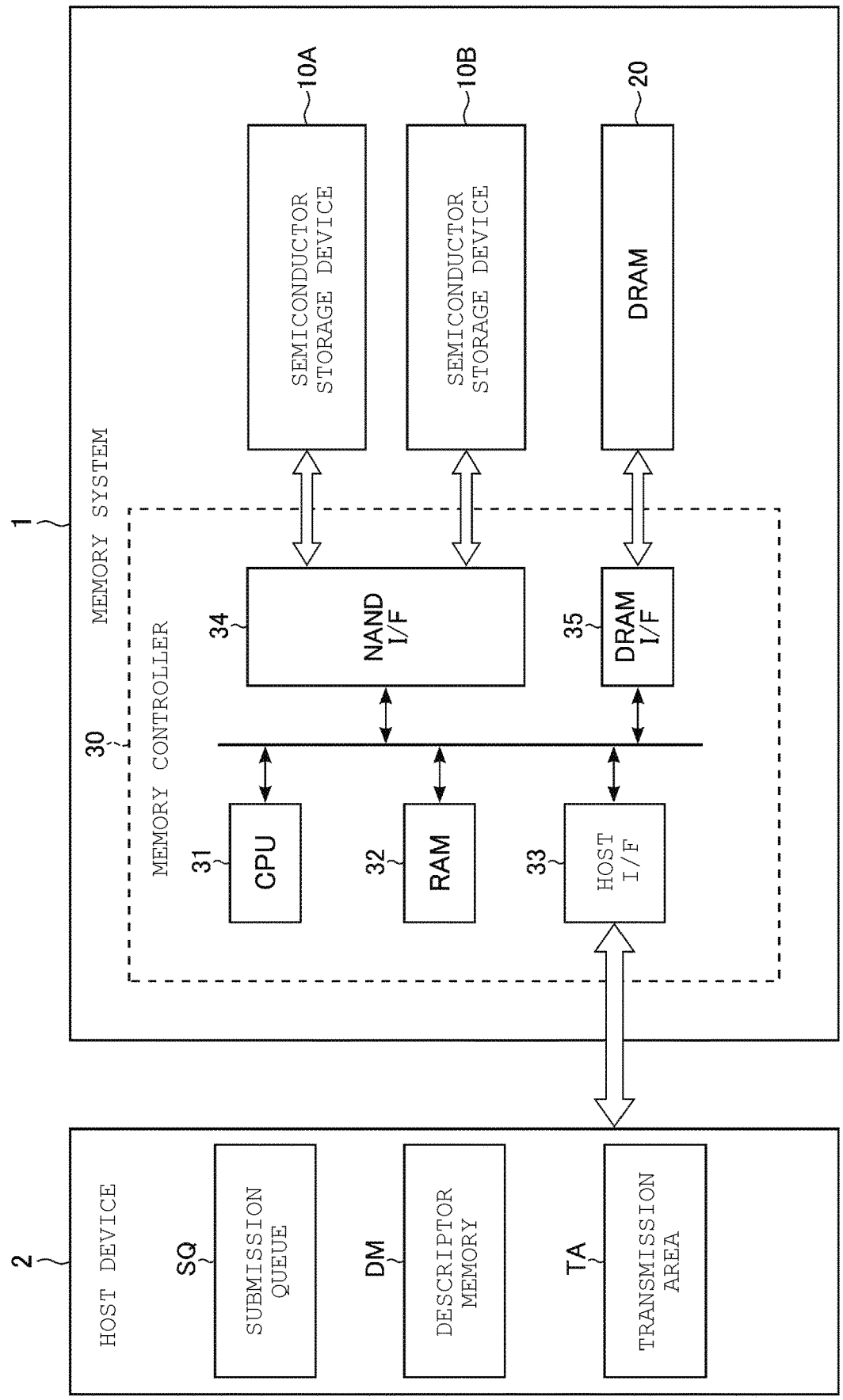
FIG. 1 is a block diagram of a memory system according to at least one embodiment.

At least one embodiment provides a memory system in which an operation of a memory system is accelerated.

In general, according to at least one embodiment, a memory system includes a semiconductor storage device and a memory controller. The memory controller controls data transmission between the semiconductor storage device and an external host device, and includes a command buffer and a descriptor buffer. The memory controller stores a first command received from outside in the command buffer, fetches a first descriptor from the host device, based on the stored first command, stores the fetched first descriptor in the descriptor buffer, stores a second command received from the outside in the command buffer, discards an unused part of the first descriptor from the descriptor buffer, fetches a second descriptor from the host device, based on the stored second command, and stores the fetched second descriptor at an address where the discarded part of the first descriptor was stored.

Hereinafter, embodiments will be described with reference to the drawings. The embodiments illustrate apparatuses or methods for embodying technical ideas of the present disclosure. The drawings are schematic or conceptual, and the dimensions and proportions of each drawing are not necessarily the same as actual ones. In the present specification, the term "connection" indicates electric connection and does not exclude an intervention of another element.

In the following description, components having substantially the same functions and configurations are denoted by the same reference numerals. A number after a character forming a reference numeral is referred to by another reference numeral including the same character and is used to distinguish elements having the same configuration. Similarly, a character after a number forming a reference numeral is referred to by another reference numeral including the same number and is used to distinguish elements having the same configuration. When it is not necessary to distinguish elements denoted by reference numerals including the same character or number, the elements are each referred to by a reference numeral including only a character or a number.

Embodiment

Hereinafter, a memory system 1 according to at least one embodiment will be described.

[1] Configuration

[1-1] Overall Configuration of Memory System 1

FIG. 1 illustrates a configuration example of the memory system 1 according to at least one embodiment. The memory system 1 according to at least one embodiment is, for example, a solid state drive (SSD), and may store data in a non-volatile manner. The memory system 1 according to at least one embodiment may perform various operations in response to a command from a host device 2 by communicating with the external host device 2. The memory system 1 according to at least one embodiment includes, for example, a semiconductor storage devices 10A and 10B, a dynamic random access memory (DRAM) 20, and a memory controller 30.

Each of the semiconductor storage devices 10A and 10B is a NAND flash memory storing data in a non-volatile manner. The number of semiconductor storage devices 10 in the memory system 1 may be any number. A specific configuration of the semiconductor storage device 10 will be described later.

The DRAM 20 is a volatile memory used as a storage area of the memory controller 30. The DRAM 20 temporarily stores, for example, write data received from the host device 2. The DRAM 20 may be embedded in the memory controller 30 or the host device 2.

The memory controller 30 is, for example, a system on chip (SoC), and in response to a command from the host device 2, instructs the semiconductor storage devices 10A and 10B to read, write, erase, and the like. The memory controller 30 includes, for example, a central processing unit (CPU) 31, a random access memory (RAM) 32, a host interface circuit (host I/F) 33, a NAND interface circuit (NAND I/F) 34, and a DRAM interface circuit (DRAM I/F) 35.

The CPU 31 is a central processing unit configured to control overall operations of the memory controller 30. For example, the CPU 31 issues a write command in response to a write command received from the host device 2. The CPU 31 performs various processes for managing a memory space of the semiconductor storage device 10, for example, wear leveling.

The RAM 32 is, for example, a volatile memory such as a static random access memory (SRAM). The RAM 32 is used as a work area of the CPU 31, and stores, for example, firmware or various management tables for managing the semiconductor storage device 10.

The host I/F 33 is a circuit that is connected to the host device 2 via a host bus to transmit and receive data, a command, and an address between the memory controller 30 and the host device 2. The host I/F 33 may support the communication interface standards, for example, Serial Advanced Technology Attachment (SATA), Serial Attached SCSI (SAS), PCI Express (PCIe) (registered trademark), and NVM Express (NVMe). A specific configuration of the host I/F 33 will be described later.

The NAND I/F 34 is a circuit that transmits and receives data, a command, and an address between the memory controller 30 and the semiconductor storage device 10. The NAND I/F 34 supports the NAND interface standard.

The DRAM I/F 35 is a circuit that is connected to the DRAM 20 to perform communication between the memory controller 30 and the DRAM 20. The DRAM I/F 35 supports the DRAM interface standard.

The host device 2 connected to the memory system 1 described above includes, for example, a submission queue SQ, a descriptor memory DM, and a transmission area TA.

The submission queue SQ is a storage portion for storing operations that the host device 2 causes the memory system 1 to perform, in a form of a so-called queue. The descriptor memory DM is a storage portion in which a plurality of descriptors used by the memory system 1 is stored. The transmission area TA is a temporary storage area used in transmitting data between the semiconductor storage device 10 and the host device 2.

[1-2] Configuration of Semiconductor Storage Device 10

Figure 2:
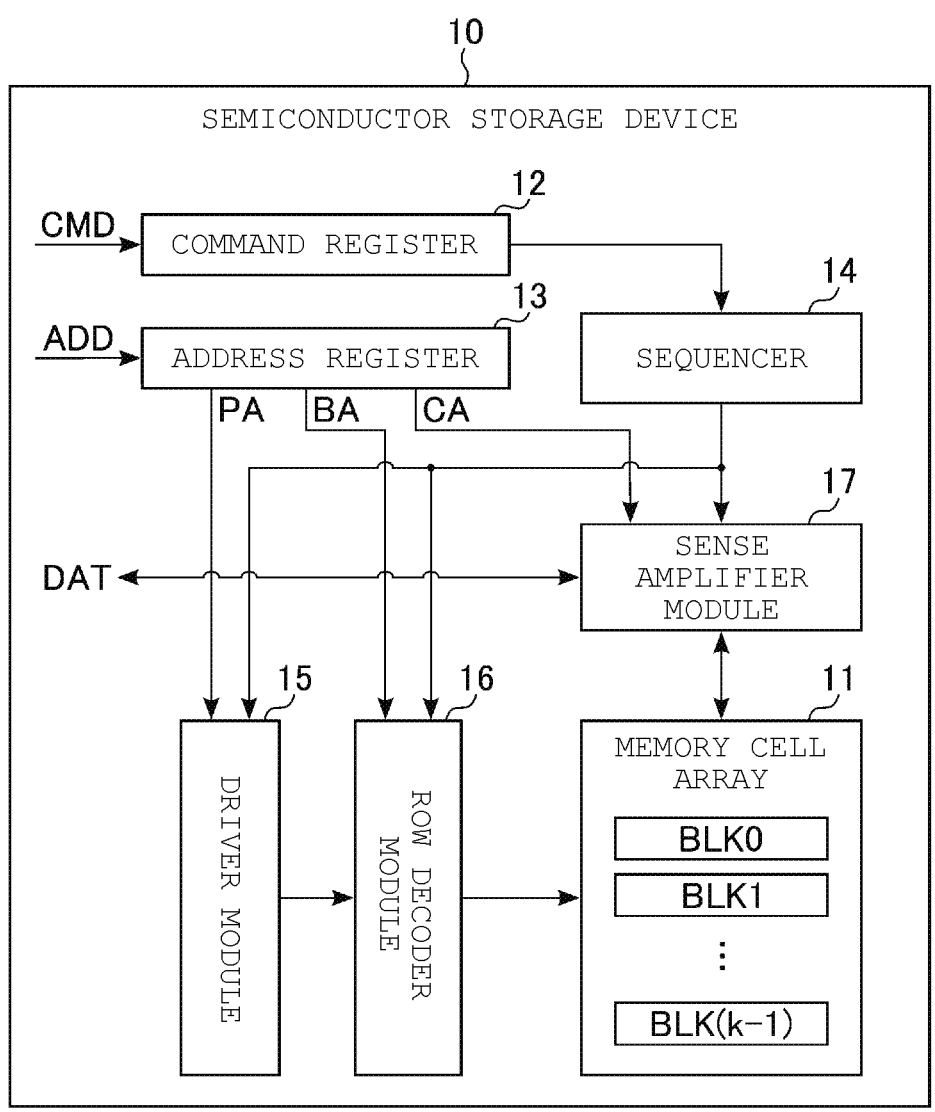
FIG. 2 is a block diagram of a semiconductor storage device provided in the memory system according to at least one embodiment.

FIG. 2 illustrates a configuration example of the semiconductor storage device 10 in the memory system 1 according to at least one embodiment. The semiconductor storage device 10 includes, for example, a memory cell array 11, a command register 12, an address register 13, a sequencer 14, a driver module 15, a row decoder module 16, and a sense amplifier module 17.

The memory cell array 11 includes a plurality of blocks BLK0 through BLK(k−1) (k is an integer equal to or greater than 1). The block BLK is a group of a plurality of memory cells capable of storing data in a non-volatile manner, and for example, is used as a data erase unit. Also, a plurality bit lines and a plurality of word lines are provided in the memory cell array 11. Each memory cell is, for example, associated with one bit line and one word line.

The command register 12 stores a command CMD received by the semiconductor storage device 10 from the memory controller 30. The command CMD includes, for example, a command causing the sequencer 14 to perform a read operation, a write operation, an erase operation, or the like.

The address register 13 stores address information ADD received by the semiconductor storage device 10 from the memory controller 30. The address information ADD includes, for example, a block address BA, a page address PA, and a column address CA. For example, the block address BA, the page address PA, and the column address CA are used to select the block BLK, the word line, and the bit line, respectively.

The sequencer 14 controls overall operations of the semiconductor storage device 10. For example, the sequencer 14 controls the driver module 15, the row decoder module 16, the sense amplifier module 17, and the like, based on the command CMD stored in the command register 12 to perform the read operation, the write operation, the erase operation, and the like.

The driver module 15 generates a voltage used in the read operation, the write operation, the erase operation, and the like. Then, the driver module 15 applies the generated voltage to a signal line corresponding to the selected word line, based on, for example, the page address PA stored in the address register 13.

The row decoder module 16 selects one block BLK in the corresponding memory cell array 11, based on the block address BA stored in the address register 13. Then, the row decoder module 16 transmits, for example, the voltage applied to the signal line corresponding to the selected word line to the selected word line in the selected block BLK.

The sense amplifier module 17 applies a desired voltage to each bit line according to write data DAT received from the memory controller 30, in the write operation. The sense amplifier module 17 determines data stored in a memory cell based on the voltage of the bit line and transmits a result of the determination to the memory controller 30 as the read data DAT, in the read operation.

[1-3] Circuit Configuration of Memory Cell Array 11

Figure 3:
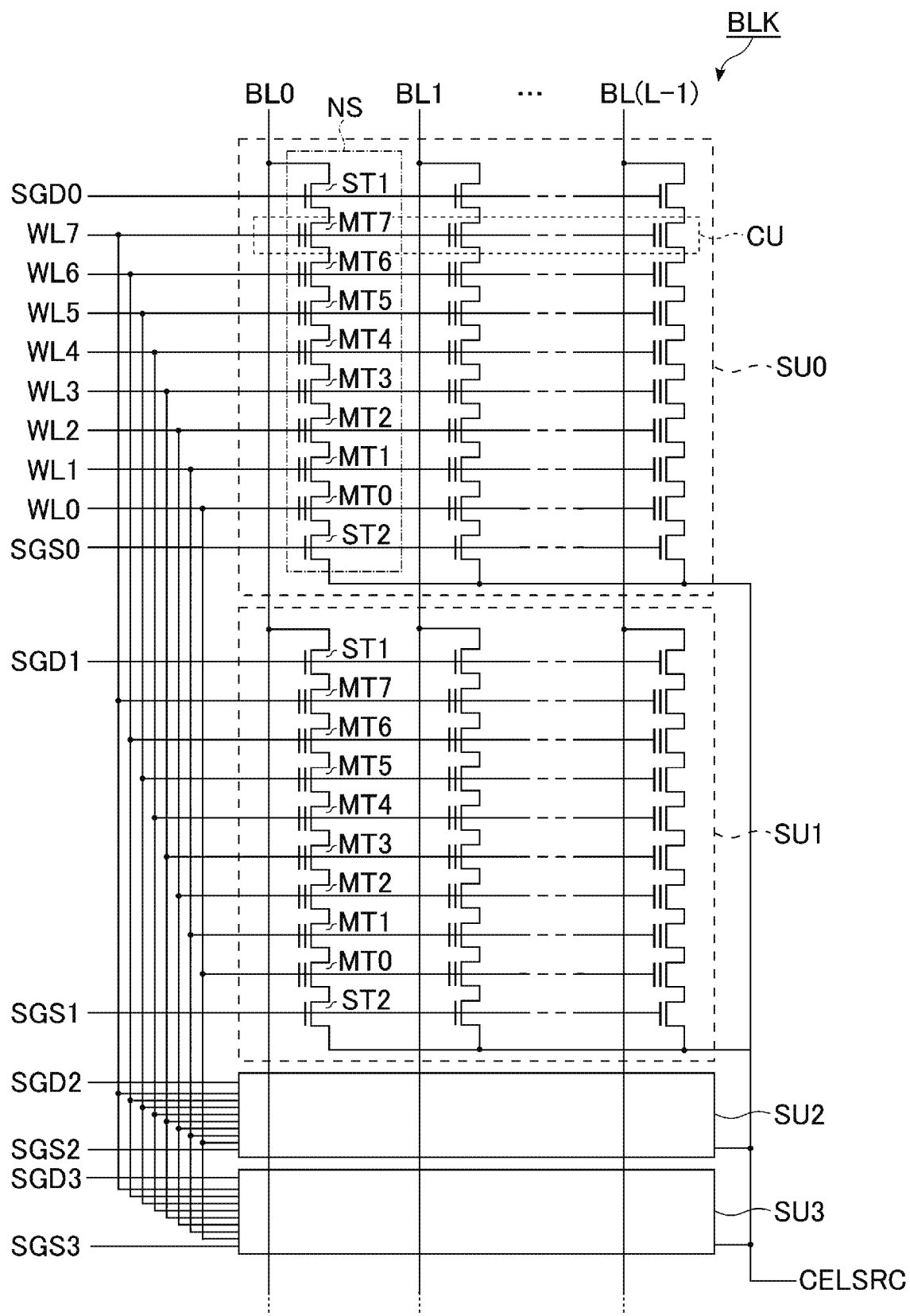
FIG. 3 is a circuit diagram of a memory cell array in the semiconductor storage device provided in the memory system according to at least one embodiment.

FIG. 3 illustrates an example of a circuit configuration of the memory cell array 11 in the semiconductor storage device 10 according to at least one embodiment, by extracting one block BLK among the plurality of blocks BLK in the memory cell array 11. The block BLK includes, for example, four string units SU0 through SU3.

Each string unit SU includes a plurality of NAND strings NS associated respectively with bit lines BL0 through BL(L−1) (L is an integer equal to or greater than 1). Each NAND string NS includes, for example, memory cell transistors MT0 through MT7 and select transistors ST1 and ST2. The memory cell transistor MT includes a control gate and a charge storage layer to store data in a non-volatile manner. Each of the select transistors ST1 and ST2 is used to select the string unit SU in various operations.

In each NAND string NS, the memory cell transistors MT0 through MT7 are connected in series. A drain of the select transistor ST1 is connected to the associated bit line BL and a source of the select transistor ST1 is connected to one end of the serially connected memory cell transistors MT0 through MT7. A drain of the select transistor ST2 is connected to the other end of the serially connected memory cell transistors MT0 through MT7. A source of the select transistor ST2 is connected to a source line SL.

In the same block BLK, the control gates of the memory cell transistors MT0 through MT7 are commonly connected to word lines WL0 through WL7, respectively. Gates of the select transistors ST1 in the string units SU0 through SU3 are commonly connected to select gate lines SGD0 through SGD3, respectively. Gates of the select transistors ST2 in the string units SU0 through SU3 are commonly connected to select gate lines SGS0 through SGS3, respectively.

In the circuit configuration of the memory cell array 11 described above, the bit line BL is shared by the NAND strings NS to which the same column address is assigned in each string unit SU. The source line SL is, for example, shared among the plurality of blocks BLK.

A group of the plurality of memory cell transistors MT connected to the common word line WL in one string unit SU is referred to as, for example, a cell unit CU. For example, storage capacity of the cell unit CU including the memory cell transistors MT each storing 1-bit data is defined as "1 page data". The cell unit CU may have storage capacity of 2 page data or larger based on the number of bits of data stored in the memory cell transistor MT.

The circuit configuration of the memory cell array 11 in the semiconductor storage device 10 according to at least one embodiment is not limited to the configuration described above. For example, the numbers of memory cell transistors MT and select transistors ST1 and ST2 in each NAND string NS may respectively be any number. The number of string units SU in each block BLK may be any number.

[1-4] Configuration of Host I/F 33

Figure 4:
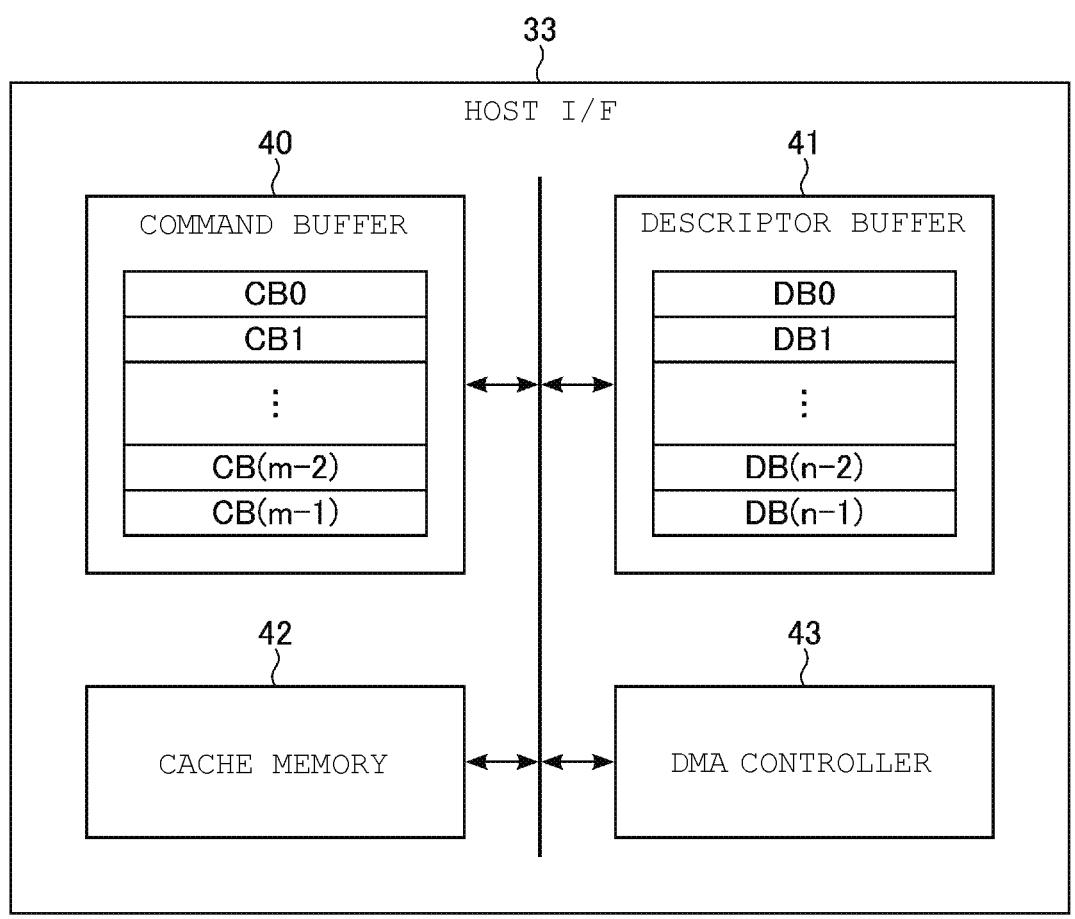
FIG. 4 is a block diagram of a host interface circuit in a memory controller provided in the memory system according to at least one embodiment.

FIG. 4 illustrates a configuration example of the host I/F 33 in the memory controller 30 according to the embodiment. The host I/F 33 includes, for example, a command buffer 40, a descriptor buffer 41, a cache memory 42, and a direct memory access (DMA) controller 43.

The command buffer 40 stores a command based on the submission queue SQ of the host device 2. The command buffer 40 includes, for example, a buffer area CB0 through CB(m−1) (m is an integer equal to or greater than 1). For example, each buffer area CB stores one command. The memory system 1 performs the read operation, the write operation, the erase operation, or the like, based on the command stored in the command buffer 40. The size of command is, for example, 64 bytes.

The descriptor buffer 41 stores a descriptor based on the command stored in the command buffer 40. The descriptor buffer 41 includes, for example, a buffer area D0 through DB(n−1) (n is an integer equal to or greater than 1). For example, each buffer area DB stores on descriptor. The memory system 1 assigns a storage area used for data transmission between the memory system 1 and the host device 2, in the transmission area TA of the host device 2, based on the descriptor stored in the descriptor buffer 41.

The cache memory 42 is a volatile memory, such as an SRAM. The cache memory 42 is used, for example, as a temporary storage area in the data transmission between the memory system 1 and the host device 2. The DMA controller 43 controls the data transmission between the memory system 1 and the host device 2. The data transmission using the DMA controller 43 is performed without control by the CPU 31. The configuration of the host I/F 33 in the memory controller according to the embodiment is not limited to the configuration described above. For example, the cache memory 42 and the DMA controller 43 may be provided at least in the memory controller 30. The DMA controller 43 may be omitted. In this case, data transmission between the memory controller 30 and the host device 2 is controlled by the CPU 31.

[2] Operation

[2-1] Operation Execution Sequence of Memory System 1

Figure 5:
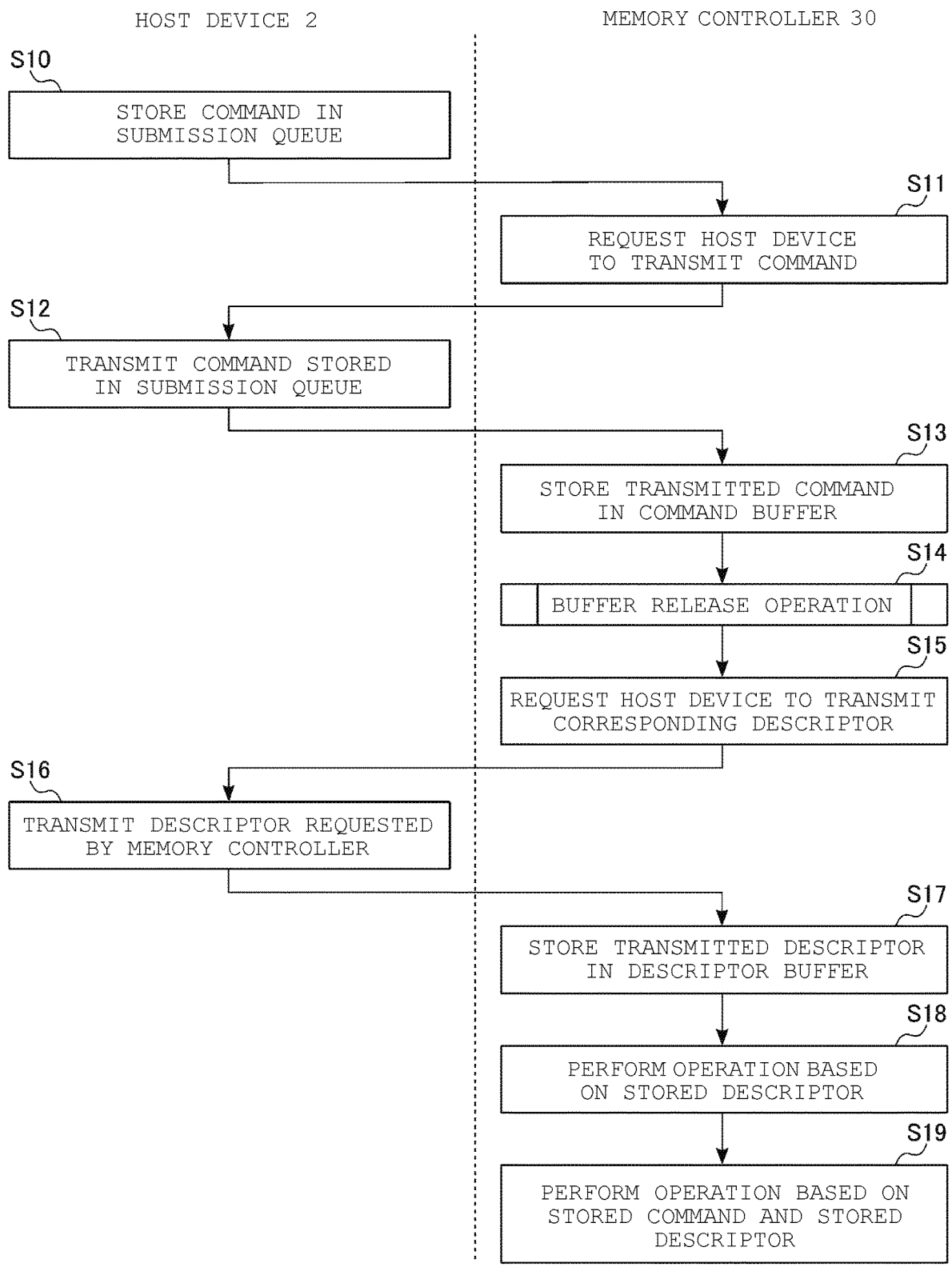
FIG. 5 is a flowchart showing an example of an operation execution sequence of the memory system according to at least one embodiment.

Hereinafter, an operation execution sequence of the memory system 1 according to at least one embodiment will be described with reference to FIG. 5. FIG. 5 is a flowchart showing an example of the operation execution sequence of the memory system 1 according to at least one embodiment.

When at least one command corresponding to a predetermined operation to be executed by the memory system 1 is stored in the submission queue SQ, the host device 2 notifies the memory system 1 that the command is stored (step S10). When it is notified that the command is stored in the submission queue SQ, the memory controller 30 requests the host device 2 to transmit the command (step S11).

When it is requested to transmit the command, the host device 2 transmits the command stored in the submission queue SQ to the memory controller 30 (step S12). Upon receiving the command from the host device 2, the memory controller 30 stores the command in the command buffer 40 (step S13).

Then, the memory controller 30 performs a buffer release operation as needed (step S14). The buffer release operation in step S14 is performed, for example, when a free area of the descriptor buffer 41 is insufficient. On the other hand, when the free area of the descriptor buffer 41 is sufficient, the buffer release operation in step S14 is skipped. Details of the buffer release operation will be described later.

Next, the memory controller 30 requests the host device 2 to transmit a descriptor based on the command stored in the command buffer 40 via the process of step S13 (step S15). The memory controller 30 fetches the descriptor corresponding to the command satisfying a predetermined condition by using the free area via the buffer release operation. In other words, the CPU 31 stores the descriptor corresponding to the command satisfying the predetermined condition in the descriptor buffer 41, instead of a descriptor having low priority. When it is requested to transmit the descriptor, the host device 2 transmits the descriptor requested by the memory controller 30 to the memory controller 30, among a plurality of descriptors stored in the descriptor memory DM (step S16). Upon receiving the descriptor from the host device 2, the memory controller 30 stores the descriptor in the descriptor buffer 41 (step S17).

Then, the memory controller 30 performs an operation based on the descriptor stored in the descriptor buffer 41 (step S18). In step S18, the memory controller 30 instructs the host device 2 to assign a storage area (a data area in the transmission area TA) used in the data transmission between the memory system 1 and the host device 2, based on the descriptor stored in the descriptor buffer 41.

Next, the memory controller 30 performs an operation based on the command stored in the command buffer 40 and the descriptor stored in the descriptor buffer 41. In other words, the memory controller 30 performs an operation (for example, a read operation, a write operation, or the like)

based on the command stored in the command buffer 40 by using the data area assigned in the transmission area TA by the descriptor stored in the descriptor buffer 41 (step S19).

For example, when the read operation is performed in step S19, the memory controller 30 transmits data read from the semiconductor storage device 10 to the transmission area TA corresponding to the descriptor stored in the descriptor buffer 41. When the write operation is performed in step S19, the memory controller 30 receives the data stored in the transmission area TA corresponding to the descriptor stored in the descriptor buffer 41 and writes the data to the semiconductor storage device 10. In other words, the memory controller 30 relays the data transmission between the semiconductor storage device 10 and the host device 2.

With respect to the operation execution sequence described above, when an operation based on the NVMe standard is performed, the memory controller 30 uses a physical region page (PRP) or a scatter gather list (SGL) for assigning of a storage area used in the data transmission. One of the PRP and the SGL to be used is determined based on the command stored in the command buffer 40. Hereinafter, the outlines of an operation sequence when the PRP is used and an operation sequence when the SGL is used in the memory system 1 according to at least one embodiment will be briefly described.

Operation Sequence During Using PRP

Figure 6:
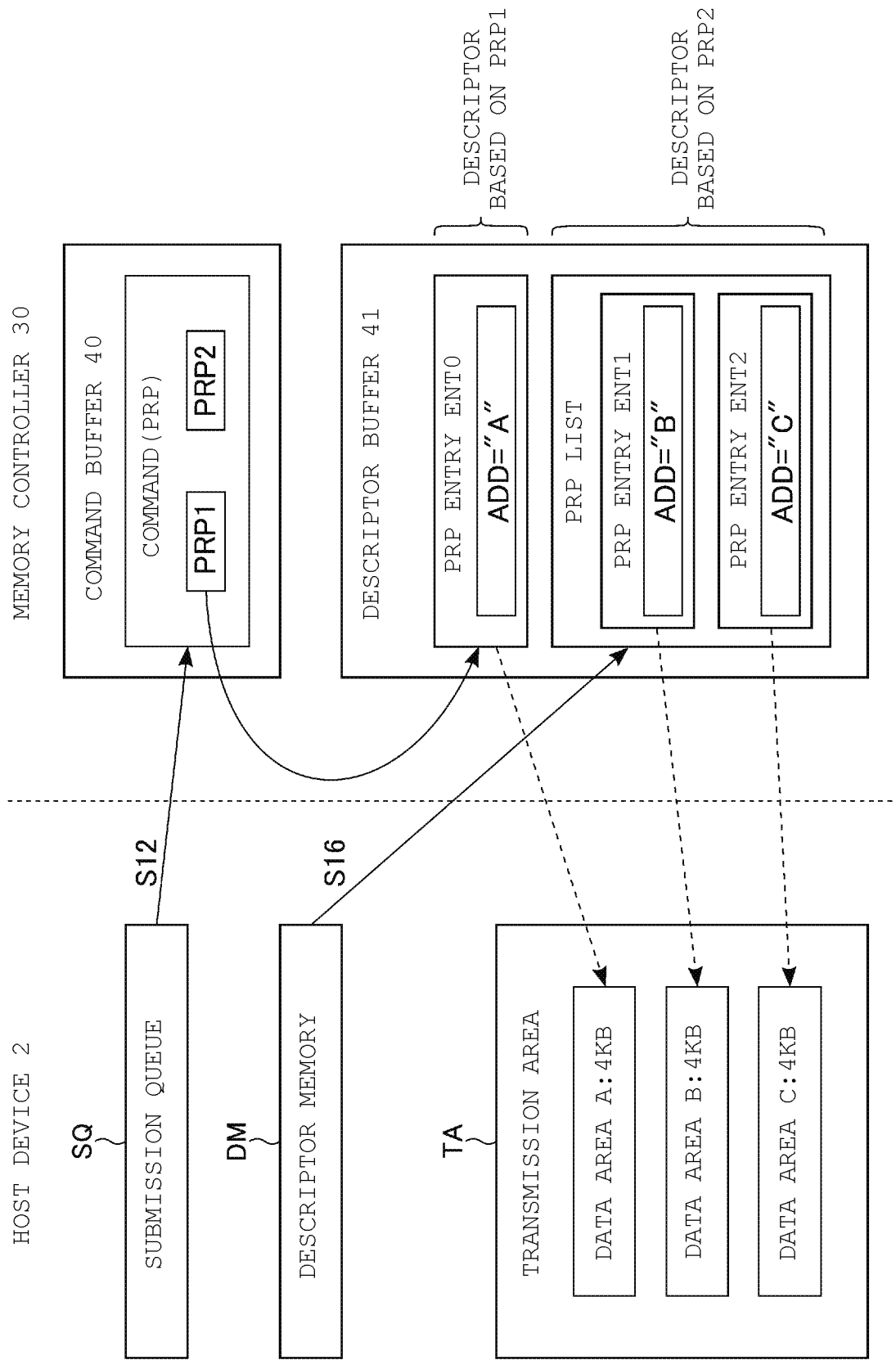
FIG. 6 is a schematic diagram showing an example of an operation sequence when a physical region page (PRP) is used in the memory system according to at least one embodiment.

In the PRP, storage areas of the same size are assigned uniformly to one descriptor excluding a head and a tail. In the operation sequence when the PRP is used, the size of data area assigned by the memory controller 30 to the transmission area TA based on the descriptor is specified as, for example, a uniform page size. FIG. 6 is a schematic diagram showing an example of the operation sequence when the PRP is used in the memory system 1 according to the embodiment. "S12" and "S16" shown in FIG. 6 respectively correspond to the processes of steps S12 and S16 described with reference to FIG. 5.

A command in FIG. 6 includes a command instructing the use of PRP and data pointers PRP1 and PRP2.

In the PRP, a descriptor in the data pointer PRP1 is transmitted from the command buffer 40 to the descriptor buffer 41 before the process of step S18. As a result, the descriptor buffer 41 stores a PRP entry ENT0 transmitted from the command buffer 40 and a PRP list transmitted from the descriptor memory DM based on the data pointer PRP2.

A PRP entry and a PRP list are descriptors specifying the storage area used for the data transmission. The PRP entry ENT0 includes head address information of the data area assigned to the transmission area TA. The PRP list includes the continued address information of the data area assigned to the transmission area TA. The PRP list is used, for example, when a transmission amount of data in the corresponding command is insufficient in the PRP entry ENT0. The PRP list includes, for example, PRP entries ENT1 and ENT2 indicating address information following the PRP entry ENT0.

In the above, the PRP entry ENT0, the PRP entry ENT1, and the PRP entry ENT2 respectively designate an address "A", an address "B", and an address "C" of the transmission area TA. In the transmission area TA, a data area A of 4 KB based on the PRP entry ENT0, a data area B of 4 KB based on the PRP entry ENT1, and a data area C of 4 KB based on the PRP entry ENT2 are assigned.

While a case in which the PRP list includes two PRP entries is described above, the embodiment is not limited thereto. The number of PRP entries in the PRP list may be any number. The PRP list may include information specifying a next PRP list when a data area necessary for the transmission area TA is unable to be allocated via one PRP list.

Operation Sequence During Using SGL

Figure 7:
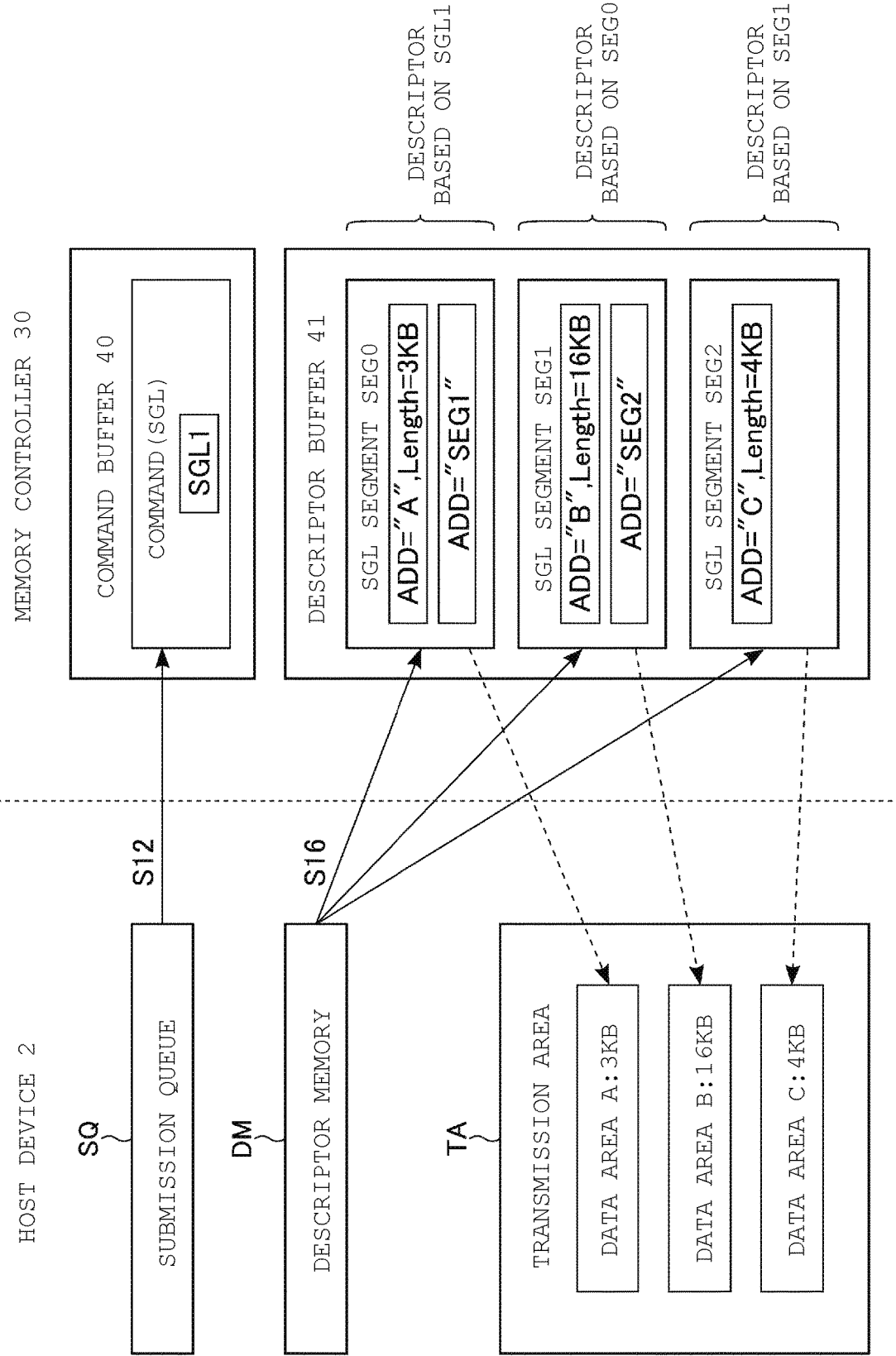
FIG. 7 is a schematic diagram showing an example of an operation sequence when a scatter gather list (SGL) is used in the memory system according to at least one embodiment.

In the SGL, a storage area of any size is assigned to one descriptor. In the operation sequence when the SGL is used, the sizes of the data areas assigned by the memory controller 30 to the transmission area TA based on the descriptor may be individually specified. FIG. 7 is a schematic diagram showing an example of the operation sequence when the SGL is used in the memory system 1 according to at least one embodiment. "S12" and "S16" shown in FIG. 7 respectively correspond to steps S12 and S16 described with reference to FIG. 5.

A descriptor based on a data pointer SGL1 includes an SGL segment SEG0. An SGL segment is a descriptor specifying an area used in the data transmission. The SGL segment SEG0 includes head address information of the data area assigned to the transmission area TA and information (for example, 3 KB) of a data length allocated in the transmission area TA. The SGL segment SEG0 may include information indicating a next SGL segment SEG1.

When the SGL segment SEG0 includes information indicating the next SGL segment SEG1, the memory controller instructs the host device 2 to transmit a descriptor corresponding to the SGL segment SEG1. The SGL segment SEG1 includes, for example, address information specifying an address following the SGL segment SEG0, information (for example, 16 KB) of a data length allocated in the transmission area TA, and information indicating a next SGL segment SEG2.

When the SGL segment SEG1 includes information indicating the next SGL segment SEG2, the memory controller instructs the host device 2 to transmit a descriptor corresponding to the SGL segment SEG2. The SGL segment SEG2 includes, for example, address information specifying an address following the SGL segment SEG1 and information (for example, 4 KB) of a data length allocated in the transmission area TA. Each of the SGL segments SEG1 and SEG2 received by the memory controller 30 is stored in the descriptor buffer 41.

In the example of FIG. 7, the SGL segment SEG2 corresponds to the last SGL segment SEG associated with the data pointer SGL1. The SGL segments SEG0, SEG1, and SEG2 respectively designate an address "A", an address "B", and an address "C" of the transmission area TA. In the transmission area TA, for example, a data area A of 3 KB based on the SGL segment SEG0, a data area B of 16 KB based on the SGL segment SEG1, and a data area C of 4 KB based on the SGL segment SEG2 are assigned.

In the above description, the SGL segment SEG1 is transmitted based on the data pointer SGL1 and the SGL segment SEG2 is transmitted based on the SGL segment SEG1, which is non-limiting. The number of SGL segments SEG transmitted based on the data pointer SGL1 may be set to any number based on a data size required for the command.

[2-2] Buffer Release Operation

In the memory system 1 according to at least one embodiment, when a plurality of commands are stored in the command buffer 40, the capacity of the descriptor buffer 41 may be insufficient for the total number of descriptors corresponding to such commands. In this regard, the memory system 1 according to at least one embodiment may perform the buffer release operation. The buffer release operation is an operation of discarding a descriptor satisfying a predetermined condition from among a plurality of descriptors stored in the descriptor buffer 41.

Figure 8:
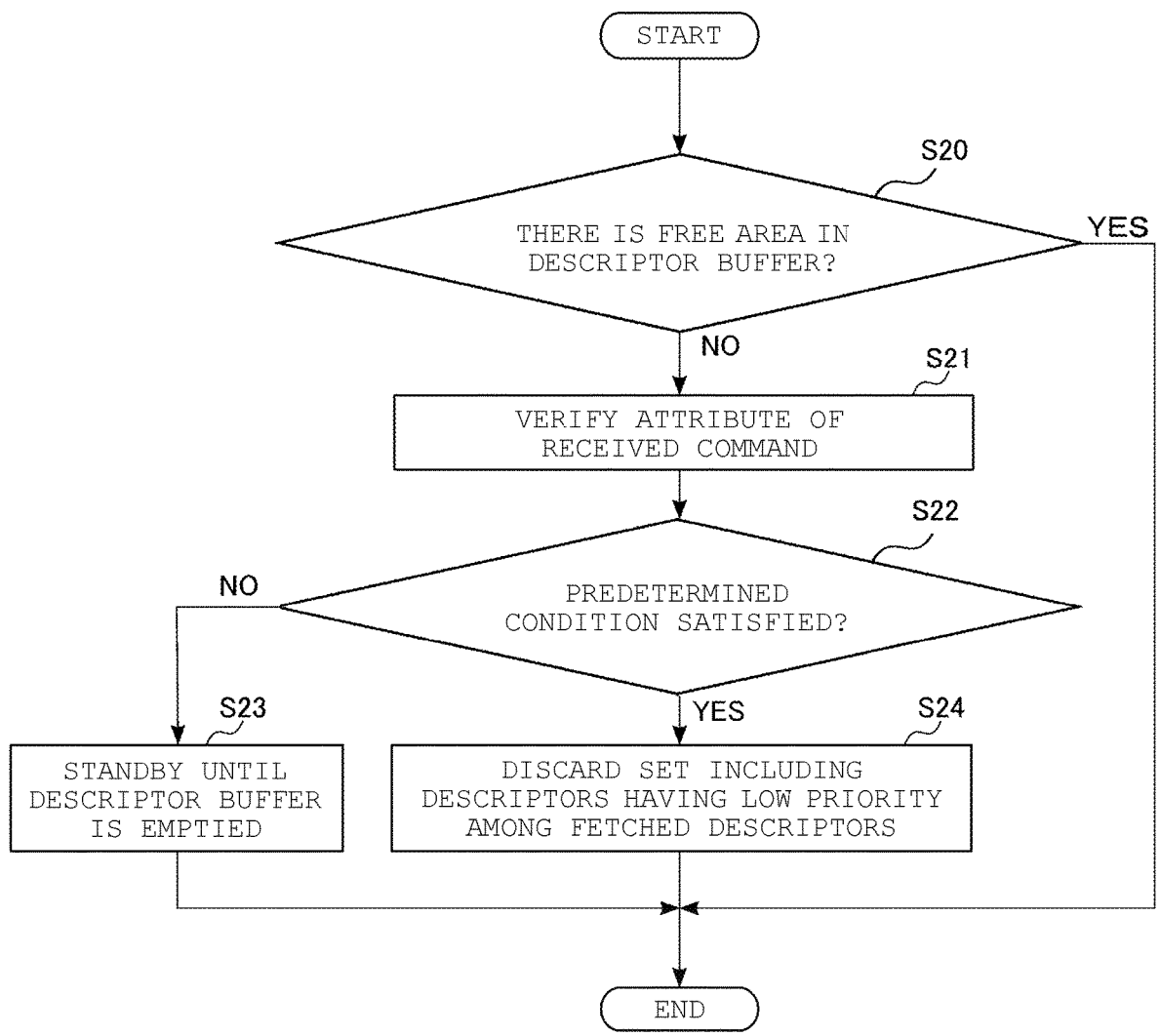
FIG. 8 is a flowchart showing an example of a buffer release operation in the memory system according to at least one embodiment.

FIG. 8 is a flowchart showing an example of the buffer release operation in the memory system 1 according to at least one embodiment. In the following description, the descriptor stored in the descriptor buffer 41 based on the command stored in the command buffer 40 will be referred to as a fetched descriptor. The storage area allocated in the transmission area TA based on the descriptor stored in the descriptor buffer 41 will be referred to as a fetched data area.

The memory controller 30 determines whether there is a free area in the descriptor buffer 41 (step S20).

When it is determined that there is a free area in the descriptor buffer 41 (step S20, YES), the memory controller 30 ends the buffer release operation (END). When it is determined that there is no free area in the descriptor buffer 41 (step S20, NO), the memory controller 30 verifies an attribute of a latest received command (step S21). An attribute of a command includes a parameter and information used for a predetermined condition described later.

The memory controller 30 determines whether the attribute of the latest received command satisfies a predetermined condition (step S22). When it is determined that the attribute of the latest received command does not satisfy the predetermined condition (step S22, NO), the memory controller 30 stands by (step S23) until the descriptor buffer 41 becomes free and ends the buffer release operation (END). When it is determined that the attribute of the latest received command satisfies the predetermined condition (step S22, YES), the memory controller 30 discards a set including descriptors having low priority among the fetched descriptors (step S24). Details of the predetermined condition in step S22 will be described later.

Figure 9:
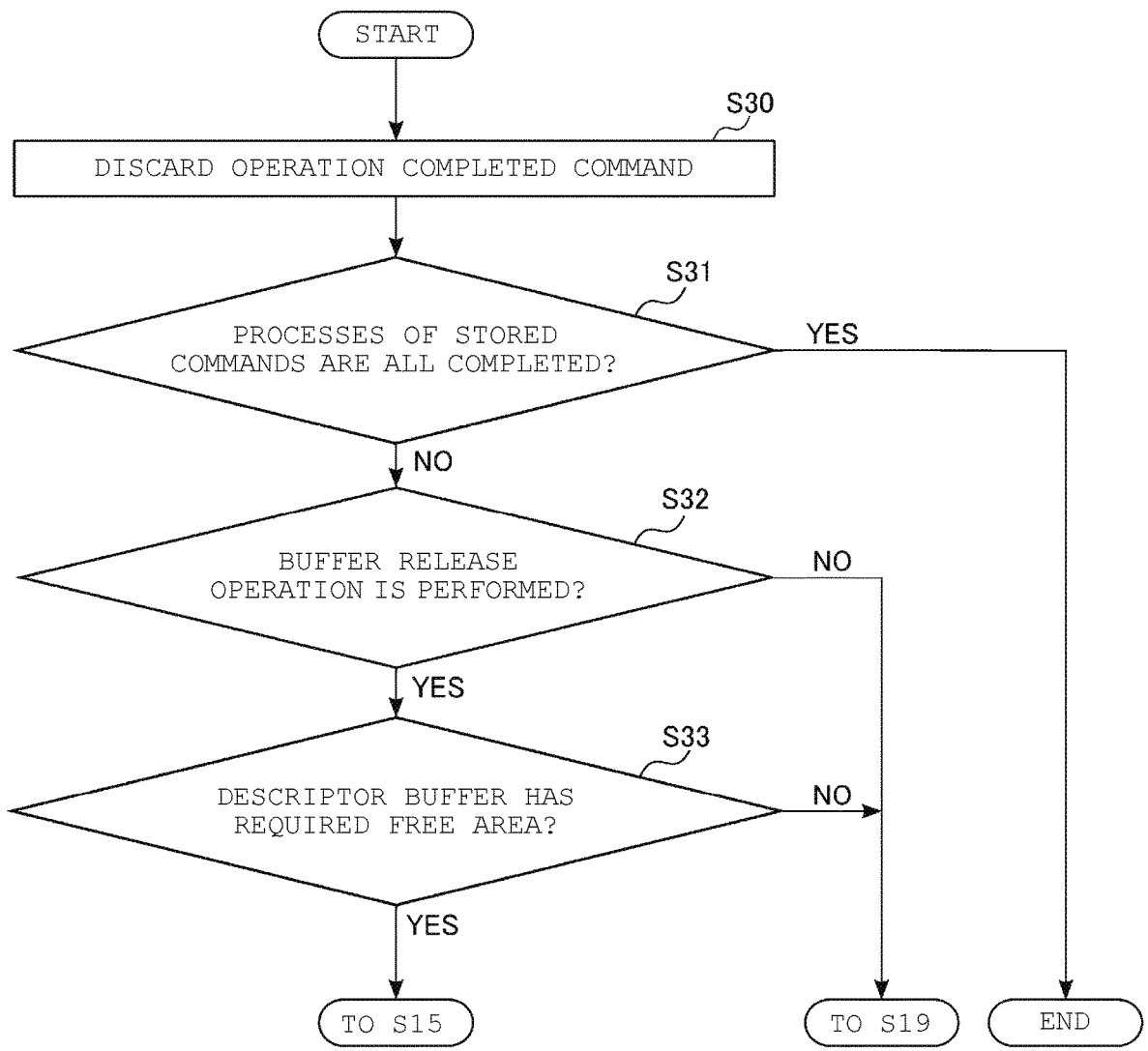
FIG. 9 is a flowchart showing an example of the buffer release operation in the memory system according to at least one embodiment.

FIG. 9 is a flowchart showing an example of a completion process of the memory system 1 according to at least one embodiment. When an operation corresponding to one command is completed via the process of step S19, the memory controller 30 performs the completion process.

The memory controller 30 discards an operation completed command stored in the command buffer 40 (step S30).

After the process of step S30, the memory controller 30 determines whether processes of all commands stored in the command buffer 40 are completed (step S31).

In step S31, when it is determined that the processes of all commands stored in the command buffer 40 are completed (step S31, YES), the memory controller 30 ends the completion process and transitions to an idle state (END).

In step S31, when it is determined that the processes of all commands stored in the command buffer 40 are not completed (step S31, NO), the memory controller 30 determines whether the commands stored in the command buffer 40 include a command of a buffer release operation target (step S32).

In the process of step S32, when it is determined that the command of the buffer release operation target is not included (step S32, NO), the memory controller 30 proceeds to step S19.

When it is determined that the command of the buffer release operation target is included (step S32, YES), the memory controller 30 determines whether there is a required free area in the descriptor buffer 41 (step S33). In other words, the memory controller 30 determines whether the same descriptor as a descriptor discarded via the buffer release operation is storable in a free area of the descriptor buffer 41 provided via the latest process of step S30.

In the process of step S33, when it is determined that there is no required free area in the descriptor buffer 41 (step S33, NO), the memory controller 30 proceeds to step S19.

In the process of step S33, when it is determined that there is a required free area in the descriptor buffer 41 (step S33, YES), the memory controller 30 fetches the same descriptor as the discarded descriptor. In particular, the host device 2 retransmits a descriptor stored at an address specified by the command to the memory controller 30, among the plurality of descriptors stored in the descriptor memory DM, based on a request of the memory controller 30. In other words, the host device 2 transmits a transmitted descriptor to the memory controller 30 again in response to a certain command.

As described above, in the memory system 1 according to at least one embodiment, the descriptor corresponding to the command of the buffer release operation target may be transmitted from the host device 2 to the memory controller 30 a plurality of times. Then, the memory controller 30 sequentially performs operations after step S16. Then, in the process of step S31, the memory controller 30 repeatedly performs the above operations until the processes of commands stored in the command buffer 40 are all completed.

Hereinafter, an example of the predetermined condition in step S22 will be described. Examples of the predetermined condition in step S22 include the number of descriptors, the number of logical blocks (NLB), a command type, and priority information.

Buffer Release Operation Based on Number of Descriptors

First, the buffer release operation based on the number of descriptors will be described. When the buffer release operation based on the number of descriptors is performed, the memory system 1 according to at least one embodiment sets a command having a large number of fetched descriptors as the buffer release operation target.

Figure 11:
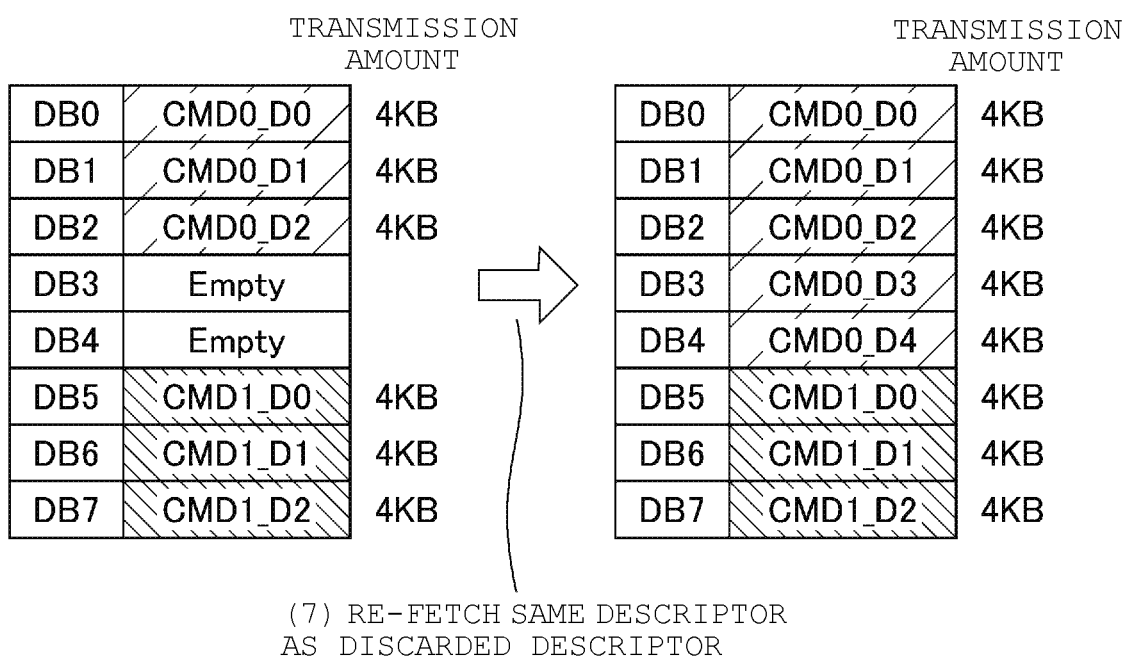
FIG. 11 is a schematic diagram showing an example of the buffer release operation based on the number of descriptors in the memory system according to at least one embodiment.

FIGS. 10 and 11 are schematic diagrams showing an example of the buffer release operation based on the number of descriptors in the memory system 1 according to at least one embodiment. In the similar drawings referred to in the following description, it is assumed that the descriptor buffer 41 only includes buffer areas DB0 through DB7 for convenience of description. In the examples of FIGS. 10 and 11, the PRP is applied.

When the memory controller 30 fetches the descriptor based on the command stored in the command buffer 40 via the process of step S13, the descriptor buffer 41 may become full (step S20, NO). In the example shown in (1) of FIG. 10, descriptors CMD0_D0 through CMD0_D4 corresponding to a command CMD0 are respectively stored in buffer areas DB0 through DB4, and descriptors CMD1_D0 through CMD1_D2 corresponding to a command CMD1 are respectively stored in buffer areas DB5 through DB7. A transmission amount of each descriptor is fixed to 4 KB.

Upon receiving a command CMD2 ((2) of FIG. 10), the memory controller 30 verifies an attribute (in this example, the number of descriptors) of a received command via the process of step S21. Then, the memory controller 30 verifies, as the predetermined condition, for example, whether the number of descriptors based on the command CMD2 is smaller than the number of descriptors of a command having the largest number of corresponding descriptors (step S22). Here, whether the predetermined condition is satisfied in the current process may be determined based on at least the number of descriptors.

Then, when the predetermined condition is satisfied (step S22, YES), the memory controller 30 discards some of the descriptors corresponding to the command having the large number of fetched descriptors via the process of step S24. In the example of (3) of FIG. 10, the descriptors CMD0_D3 and CMD0_D4 that are some of the descriptors of the command CMD0 stored in the buffer areas DB3 and DB4 are discarded.

Subsequently, the memory controller 30 requests the host device 2 to transmit descriptors based on the command CMD2 via the process of step S15, and the host device 2 transmits the requested descriptors to the memory controller 30 via the process of step S16 ((4) of FIG. 10). Then, the memory controller 30 stores descriptors CMD2_D0 and CMD2_D1 respectively corresponding to the command CMD2 in the buffer areas DB3 and DB4 via step S17. Next, the memory controller instructs the host device 2 to assign data areas corresponding to the descriptors CMD2_D0 and CMD2_D1 via the process of step S18. Then, the memory controller 30 performs an operation based on the command CMD2 and the descriptors CMD2_D0 and CMD2_D1 via the process of step S19, i.e., an operation based on the command CMD2 by using the data areas assigned in the transmission area TA by the descriptors CMD2_D0 and CMD2_D1 ((5) of FIG. 10).

When the operation based on the command CMD2 and the descriptors CMD2_D0 and CMD2_D1 is completed, the memory controller 30 performs the completion process of the operation in the process of step S30 ((6) of FIG. 11). In this case, the descriptors CMD2_D0 and CMD2_D1 of the command CMD2 stored in the buffer areas DB3 and DB4 are discarded. As a result, the descriptor buffer 41 has a free area, and thus the memory controller 30 fetches the same descriptor as the discarded descriptor ((7) of FIG. 11). In particular, the memory controller 30 requests the host device 2 to transmit the descriptors CMD0_D3 and CMD0_D4 again, based on the command CMD0 and the descriptors CMD0_D0 to CMD0_D2 of the command CMD0 left without being discarded. In other words, the memory controller 30 fetches, from the host device 2, the same descriptors as some of the descriptors discarded via the buffer release operation. Then, the received descriptors CMD0_D3 and CMD0_D4 are stored in the buffer areas DB3 and DB4 again. Next, the memory controller 30 starts performing an operation based on the command CMD0 and the descriptors CMD0_D0 through CMD0_D4, i.e., an operation based on the command CMD0 by using the data areas assigned in the transmission area TA by the descriptors CMD0_D0 through CMD0_D4 ((8) of FIG. 11).

The above description shows that the same descriptor as the descriptor discarded via the buffer release operation is stored at the same address as before being discarded in the descriptor buffer 41, which is non-limiting. The address where the same descriptor as the discarded descriptor is stored may be any address as long as it is a free address in the descriptor buffer 41.

Buffer Release Operation Based on NLB

Next, the buffer release operation based on the NLB will be described. The NLB indicates a data amount transmitted by the fetched descriptor. When the buffer release operation based on the NLB is performed, the memory system 1 according to the embodiment sets a command having a large NLB in the fetched descriptor as the buffer release operation target.

FIG. 12 is a schematic diagram showing an example of the buffer release operation based on the NLB in the memory system 1 according to at least one embodiment. In the example shown in FIG. 12, the SGL is applied. When the memory controller 30 fetches descriptors based on the command stored in the command buffer 40 via the process of step S13, the descriptor buffer 41 may become full (step S20, NO). In the example shown in (1) of FIG. 12, a transmission amount of each of the descriptors CMD0_D0 through DMD0_D4 is set to 1 KB, and transmission amounts of the descriptors CMD1_D0 through CMD1_D2 are respectively set to 32 KB, 4 KB, and 4 KB.

Upon receiving the command CMD2 ((2) of FIG. 12), the memory controller 30 verifies an attribute (in this embodiment, the NLB) of the received command via the process of step S21. Then, the memory controller 30 verifies, as the predetermined condition, for example, whether the NLB based on the command CMD2 is smaller than an NLB of a corresponding command having the largest NLB (step S22). In the current process, it may be determined whether the predetermined condition is satisfied based on at least the NLB.

When it is determined that the predetermined condition is satisfied (step S22, YES), the memory controller 30 discards (the buffer release operation) some of descriptors corresponding to the command having the large NLB via the process of step S24. In the example shown in (3) of FIG. 12, the descriptors CMD1_D1 and CMD1_D2 of the command CMD1 stored in the buffer areas DB6 and DB7 are discarded.

Subsequently, the memory controller 30 requests the host device 2 to transmit the descriptor based on the command CMD2 via the process of step S15, and the host device 2 transmits the requested descriptor to the memory controller 30 via the process of step S16 ((4) of FIG. 12). Then, the memory controller 30 stores the descriptors CMD2_D0 and CMD2_D1 respectively corresponding to the command CMD2 in the buffer areas DB6 and DB7 via step S17. Data transmission amounts of the descriptors CMD2_D0 and CMD2_D1 are respectively set to 16 KB and 8 KB, and thus are larger than data transmission amounts of the discarded descriptors. Next, the memory controller 30 instructs the host device 2 to assign data areas corresponding to the descriptors CMD2_D0 and CMD2_D1 via the process of step S18. Then, the memory controller 30 performs an operation based on the command CMD2 and the descriptors CMD2_D0 and CMD2_D1 via the process of step S19, i.e., an operation based on the command CMD2 by using the data areas assigned in the transmission area TA by the descriptors CMD2_D0 and CMD2_D1 ((5) of FIG. 12). Since other operations are the same as the buffer release operation based on the number of descriptors, descriptions thereof are omitted.

Buffer Release Operation Based on Command Type

Next, the buffer release operation based on the command type will be described. The command type indicates a type of operation performed based on the command. For example, the command type corresponds to any one of a read operation, a write operation, and the like.

When the buffer release operation based on the command type is performed, the memory system 1 according to at least one embodiment sets a descriptor based on a command corresponding to a command type having low priority as the buffer release operation target, among the fetched descriptors.

FIG. 13 is a schematic diagram showing an example of the buffer release operation based on the command type in the memory system 1 according to at least one embodiment. When the memory controller 30 fetches the descriptors based on the command stored in the command buffer 40 via the process of step S13, the descriptor buffer 41 may become full (step S20, NO). In the example shown in (1) of FIG. 13, command types of the descriptors CMD0_D0 through CMD0_D4 are set to write, and command types of the descriptors CMD1_D0 through CMD1_D2 are set to read. Further, low priority is set to the write and high priority is set to the read.

Upon receiving the command CMD2 ((2) of FIG. 13), the memory controller 30 verifies an attribute (in this example, the command type) of the received command via the process of step S21. Then, the memory controller 30 verifies, as the predetermined condition, whether the priority of the command type of the command CMD2 is higher than that of command types of the fetched commands CMD0 and CMD1 (step S22). In this process, whether the predetermined condition is satisfied may be determined based on at least the command type.

Then, when it is determined that the predetermined condition is satisfied (step S22, YES), the memory controller 30 discards (the buffer release operation) some of the fetched descriptors based on a command belonging to the command type having low priority via the process of step S24. In the example shown in (3) of FIG. 13, the descriptors CMD0_D3 and CMD0_D4 of the command CMD0 stored in the buffer areas DB3 and DB4 are discarded.

Subsequently, the memory controller 30 requests the host device 2 to transmit the descriptor based on the command CMD2 via the process of step S15, and the host device 2 transmits the requested descriptor to the memory controller 30 via the process of step S16 ((4) of FIG. 13). Then, the memory controller 30 stores the descriptors CMD2_D0 and CMD2_D1 respectively corresponding to the command CMD2 in the buffer areas DB6 and DB7 via the process of step S17. Command types of the descriptors CMD2_D0 and CMD2_D1 are set to read. Next, the memory controller 30 instructs the host device 2 to assign the data areas corresponding to the descriptors CMD2_D0 and CMD2_D1 via the process of step S18. Then, the memory controller 30 performs the operation based on the command CMD2 and the descriptors CMD2_D0 and CMD2_D1 via the process of step S19, i.e., the operation based on the command CMD2 by using the data areas assigned in the transmission area TA by the descriptors CMD2_D0 and CMD2_D1 ((5) of FIG. 13). Since other operations are the same as the buffer release operation based on the number of descriptors, descriptions thereof are omitted.

Buffer Release Operation Based on Priority Information

Next, the buffer release operation based on the priority information will be described. As the priority information, for example, any parameter, such as write priority setting, a data transmission method, latency information, a data set management value, or the like, may be used.

Here, an example of a method of setting priority in the priority information will be described. The memory system 1 may perform parallel processes on the plurality of semiconductor storage devices 10 by the descriptor buffer 41 storing a plurality of sets including descriptors respectively corresponding to the plurality of commands CMD. The memory system 1 is more likely to perform the parallel processes when a plurality of sets including the commands CMD having a smaller number of required descriptors than the commands CMD having a large number of required descriptors. Thus, as the method of setting priority, setting the priority of the command CMD having the smaller number of required descriptors to be higher than the priority of the command CMD having the large number of required descriptors is considered.

As a specific example, an example of setting priority when the data transmission method is used as the priority information will be briefly described. Examples of the data transmission method include sequential transmission and random transmission. Since the sequential transmission has a smaller number of addresses to be specified than the random transmission, the number of descriptors may be smaller than the random transmission. Accordingly, when the data transmission method is used as the priority information, for example, the priority of the sequential transmission is set to high and that of the random transmission is set to low.

When the buffer release operation based on the priority information is performed, the memory system 1 according to at least one embodiment sets a descriptor based on a command corresponding to an operation having low priority as the buffer release operation target among the fetched descriptors.

Figure 14:
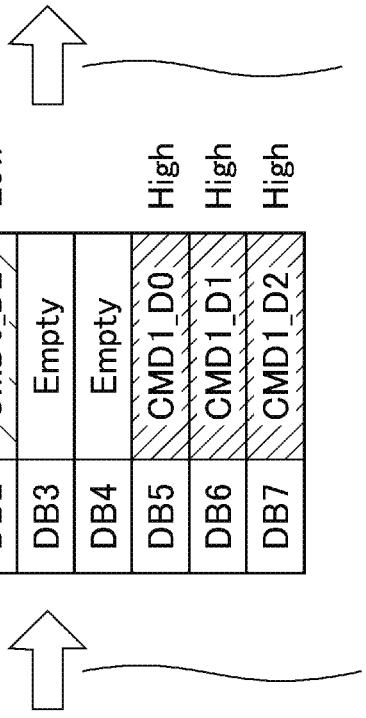
FIG. 14 is a schematic diagram showing an example of the buffer release operation based on priority in the memory system according to at least one embodiment.

FIG. 14 is a schematic diagram showing an example of the buffer release operation based on priority in the memory system 1 according to at least one embodiment. When the memory controller 30 fetches the descriptors based on the commands stored in the command buffer 40 via the process of step S13, the descriptor buffer 41 may become full (step S20, NO). In the example shown in (1) of FIG. 14, the priority of the descriptors CMD0_D0 through CMD0_D4 is set to low and priority of the descriptors CMD1_D0 through CMD1_D2 is set to high. In particular, for example, the descriptors CMD0_D0 through CMD0_D4 having low priority correspond to the random transmission and the descriptors CMD1_D0 through CMD1_D2 having high priority correspond to the sequential transmission.

Next, upon receiving the command CMD2 ((2) of FIG. 14), the memory controller 30 verifies an attribute (in this example, the priority information) of the received command via the process of step S21. Then, the memory controller 30 verifies, as the predetermined condition, whether the priority based on the priority information of the command CMD2 is higher than that of the fetched commands CMD0 and CMD1 (step S22). In the current process, whether the predetermined condition is satisfied may be determined based on at least the priority information.

When it is determined that the predetermined condition is satisfied (step S22, YES), the memory controller 30 discards some of descriptors corresponding to the command having the low priority via the process of step S24. In the example shown in (3) of FIG. 14, the descriptors CMD0_D3 and CMD0_D4 of the command CMD0 stored in the buffer areas DB3 and DB4 are discarded.

Subsequently, the memory controller 30 requests the host device 2 to transmit the descriptors based on the command CMD2 ((4) of FIG. 14). Then, the memory controller 30 stores the descriptors CMD2_D0 and CMD2_D1 respectively corresponding to the command CMD2 in the buffer areas DB6 and DB7. The descriptors CMD2_D0 and CMD2_D1 are set to high priority, and have higher priority than the discarded descriptors. Then, the memory controller 30 performs the operation based on the command CMD2 and the descriptors CMD2_D0 and CMD2_D1, i.e., the operation based on the command CMD2 by using the data areas assigned in the transmission area TA by the descriptors CMD2_D0 and CMD2_D1 ((5) of FIG. 14). Since other operations are the same as the buffer release operation based on the number of descriptors, descriptions thereof are omitted.

[3] Effects of Embodiments

According to the memory system 1 according to at least one embodiment, an operation of the memory system 1 is able to be accelerated. Hereinafter detailed effects of the memory system 1 according to at least one embodiment will be described.

The memory system 1 such as SSD or the like requests the host device 2 to transmit a descriptor based on a command to be executed, when performing an operation based on an instruction of the host device 2. Then, the host device 2 transmits the descriptor requested by the memory system 1 to the memory system. In the NVMe, the PRP and the SGL are used to transmit the descriptor based on such a command. Each of the PRP and the SGL provides a descriptor chain to enable scatter or gather transmission.

Descriptors corresponding to the PRP and the SGL are stored in the descriptor memory DM in the host device 2. Accordingly, the memory controller 30 needs to fetch (pre-fetch) a descriptor stored in the descriptor memory DM before performing the data transmission between the host device 2 and the memory system 1. The memory controller 30 stores the pre-fetched data in, for example, the descriptor buffer 41.

For the descriptor buffer 41, it is assumed, for example, that a fixed area is assigned for each command. In this case, areas in the descriptor buffer 41 are easily managed and the number of commands capable of being executed simultaneously is always uniform (the largest number of commands storable in the descriptor buffer 41).

Meanwhile, for a command that requires an area larger than the fixed area, a plurality of the fixed areas are assigned to one command. In this case, an area that is not used in the assigned fixed area may be generated. In the command to which the plurality of fixed areas are assigned, when a transmission size of a corresponding descriptor is small, the total transmission size by the descriptors stored in the descriptor buffer 41 is small. In other words, the data transmission amount between the memory system 1 and the host device 2 is decreased, thereby deteriorating transmission performance of the memory system 1. When the number of commands that require the plurality of fixed areas is increased, the number of commands pre-fetchable by the memory system 1 is decreased. In this case, the memory system 1 may be unable to pre-fetch commands capable of being processed in parallel.

In the descriptor buffer 41, a required area may be assigned for each command. In this case, a suitable area is assigned for a command having a large use area of the descriptor buffer 41. Accordingly, the memory controller 30 is able to manage the areas of the descriptor buffer 41 such that a free area is reduced, and thus the number of pre-fetched commands is able to be prevented from being reduced. On the other hand, a plurality of commands that have large use areas of the descriptor buffer 41 and are unable to be processed in parallel may be pre-fetched. In this case, the data transmission amount between the memory system 1 and the host device 2 is reduced, thereby deteriorating the transmission performance of the memory system 1.

In order to prevent the deterioration of the transmission performance with respect to the memory assigning method above, the capacity of the descriptor buffer 41 may be increased. However, when the capacity of the descriptor buffer 41 is increased, a large circuit area is required and manufacturing costs of the memory system 1 may be increased.

Thus, the memory system 1 according to at least one embodiment dynamically releases the descriptor buffer 41 and performs reassignment. In other words, the memory system 1 according to at least one embodiment first processes an operation having high priority by temporarily discarding a descriptor of an operation having low priority.

In particular, the memory system 1 according to at least one embodiment receives a new command and when the free area of the descriptor buffer 41 is sufficient, fetches a descriptor. Also, the memory system 1 according to at least one embodiment receives a new command, and when the free area of the descriptor buffer 41 is insufficient, temporarily discards an unused descriptor from the descriptor buffer 41 and uses the corresponding area to fetch a descriptor of the new command.

In the memory system 1 according to at least one embodiment, various methods may be used as an algorithm of reassigning a descriptor stored in the descriptor buffer 41. For example, the memory system 1 according to at least one embodiment performs the buffer release operation of the descriptor buffer 41 based on the number of descriptors, the NLB, the command type, the priority information, or the like.

For example, since the read operation has a large internal latency, the number of commands capable of parallel execution with respect to the plurality of semiconductor storage devices 10 is larger than that of the write operation. Accordingly, when the new command corresponds to the read operation and the fetched descriptors include a descriptor corresponding to the write operation, the fetched descriptor corresponding to the write operation is discarded and the descriptor corresponding to the read operation may be fetched.

As a result, the memory system 1 according to at least one embodiment is able to flexibly optimize the transmission performance, thereby efficiently extracting the transmission performance under limited memory capacity. In other words, in the memory system 1 according to at least one embodiment, the efficiency of using the plurality of semiconductor storage devices 10 is able to be improved. Also, the memory system 1 according to at least one embodiment may achieve the same effects even when another algorithm is used. Each algorithm is appropriately customized to provide optimum performance to a user.

[4] Modifications

A memory system according to at least one embodiment includes a semiconductor storage device and a memory controller. The memory controller controls data transmission between the semiconductor storage device and a host device, and includes a command buffer and a descriptor buffer. The memory controller stores a first command received from the outside in the command buffer, fetches a first descriptor from the host device, based on the stored first command, stores the fetched first descriptor in the descriptor buffer, stores a second command received from the outside in the command buffer, discards an unused part of the first descriptor from the descriptor buffer, fetches a second descriptor from the host device, based on the stored second command, and stores the fetched second descriptor at an address where the discarded part of the first descriptor was stored. Accordingly, an operation of the memory system according to at least one embodiment may be accelerated.

In the description of the operation of the memory system 1 according to at least one embodiment, the memory controller 30 receives one new command when the descriptor buffer 41 is full, which is non-limiting. The memory controller 30 may appropriately receive a new command as long as the command buffer 40 has a free area. The memory controller 30 may appropriately perform a buffer release operation.

While the description of the operation of the memory system 1 according to at least one embodiment shows the NVMe as an example, another interface standard may operate in the similar manner. In the memory system 1 according to at least one embodiment, at least the memory controller 30 may discard a descriptor that is fetched but has an uncompleted corresponding operation, and re-fetch a descriptor stored at the same address of the descriptor memory DM.

In the present specification, a "same descriptor" indicates a descriptor stored at the same address in the descriptor memory DM. According to at least one embodiment, a release size of a buffer area of the descriptor buffer 41 in a buffer release operation may be appropriately changed. The memory system 1 according to at least one embodiment needs to release the buffer area DB as much as it is possible to fetch a descriptor corresponding to at least a new command.

According to at least one embodiment, a plurality of types are described as algorithms of a buffer release operation, in which the algorithms may be combined. The memory system 1 may perform the buffer release operation in consideration of, for example, both the number of descriptors and the NLB. Other algorithms may be combined in the similar manner, and priority in the buffer release operation may be complexly determined by using at least three algorithms.

In at least one embodiment, a descriptor whose operation is not completed is discarded via a buffer release operation, which is non-limiting. For example, the memory controller 30 may overwrite a descriptor based on a new command at an address where a descriptor of a buffer release operation target is stored. In this case, the overwritten descriptor is treated in the same manner as a descriptor discarded in each buffer release operation described in the embodiments. Also, the memory controller 30 may overwrite a descriptor when re-fetching the overwritten descriptor from the host device 2. In this case as well, the memory system may achieve the same effects as the embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a semiconductor storage device; and
a memory controller configured to control data transmission between the semiconductor storage device and an external host device and comprising a command buffer and a descriptor buffer, wherein
the memory controller is further configured to:
store a first command received from outside in the command buffer;
fetch a first descriptor from the host device, based on the stored first command;
store the fetched first descriptor in the descriptor buffer;
store a second command received from the outside in the command buffer;
discard an unused part of the first descriptor from the descriptor buffer;
fetch a second descriptor from the host device, based on the stored second command; and
store the fetched second descriptor at an address where the discarded part of the first descriptor was stored.

2. The memory system according to claim 1, wherein the memory controller is configured to discard the unused part of the first descriptor from the descriptor buffer, based on the priority of the second command.

3. The memory system according to claim 1, wherein the memory controller is configured to discard the unused part of the first descriptor from the descriptor buffer, based on a free area in the descriptor buffer.

4. The memory system according to claim 1, wherein the memory controller is configured to, after performing an operation based on the second command stored in the command buffer by using a region assigned to the host device based on the second descriptor stored in the descriptor buffer, fetch a third descriptor that is a same descriptor as the discarded part of the first descriptor from the host device, based on the stored first command, and store the fetched third descriptor in the descriptor buffer.

5. The memory system according to claim 2, wherein the memory controller is configured to, after performing an operation based on the second command stored in the command buffer by using a region assigned to the host device based on the second descriptor stored in the descriptor buffer, fetch a third descriptor that is a same descriptor as the discarded part of the first descriptor from the host device, based on the stored first command, and store the fetched third descriptor in the descriptor buffer.

6. The memory system according to claim 3, wherein the memory controller is configured to, after performing an operation based on the second command stored in the command buffer by using a region assigned to the host device based on the second descriptor stored in the descriptor buffer, fetch a third descriptor that is a same descriptor as the discarded part of the first descriptor from the host device, based on the stored first command, and store the fetched third descriptor in the descriptor buffer.

7. The memory system according to claim 1, wherein the memory controller is configured to determine whether to discard the first descriptor, based on the number of descriptors corresponding to commands stored in the command buffer, and
the number of descriptors fetched by the memory controller from the host device based on the first command is larger than the number of descriptors fetched by the memory controller from the host device based on the second command.

8. The memory system according to claim 2, wherein the memory controller is configured to determine whether to discard the first descriptor, based on the number of descriptors corresponding to commands stored in the command buffer, and
the number of descriptors fetched by the memory controller from the host device based on the first command is larger than the number of descriptors fetched by the memory controller from the host device based on the second command.

9. The memory system according to claim 3, wherein the memory controller is configured to determine whether to discard the first descriptor, based on the number of descriptors corresponding to commands stored in the command buffer, and the number of descriptors fetched by the memory controller from the host device based on the first command is larger than the number of descriptors fetched by the memory controller from the host device based on the second command.

10. The memory system according to claim 1, wherein the memory controller is configured to determine whether to discard the first descriptor, based on a data transmission amount corresponding to a descriptor stored in the descriptor buffer, and
a data transmission amount between the memory system and the host device based on the first descriptor is larger than a data transmission amount between the memory system and the host device based on the second descriptor.

11. The memory system according to claim 2, wherein the memory controller is configured to determine whether to discard the first descriptor, based on a data transmission amount corresponding to a descriptor stored in the descriptor buffer, and
a data transmission amount between the memory system and the host device based on the first descriptor is larger than a data transmission amount between the memory system and the host device based on the second descriptor.

12. The memory system according to claim 3, wherein the memory controller is configured to determine whether to discard the first descriptor, based on a data transmission amount corresponding to a descriptor stored in the descriptor buffer, and
a data transmission amount between the memory system and the host device based on the first descriptor is larger than a data transmission amount between the memory system and the host device based on the second descriptor.

13. The memory system according to claim 1, wherein the memory controller is configured to verify a type of an operation corresponding to the first command, and when the type of the operation is a write operation, determine to discard the stored first descriptor from the descriptor buffer, and when the type of the operation is a read operation, determine not to discard the stored first descriptor from the descriptor buffer.

14. A memory system comprising:
a semiconductor storage device; and
a memory controller configured to control data transmission between the semiconductor storage device and an external host device, and comprising a command buffer and a descriptor buffer, wherein
the memory controller is further configured to:
store a first command received from outside in the command buffer;
fetch a first descriptor from the host device, based on the stored first command;
store the fetched first descriptor in the descriptor buffer;
store a second command received from the outside in the command buffer;
fetch a second descriptor from the host device, based on the stored second command; and
overwrite the fetched second descriptor at an address where an unused part of the first descriptor is stored.

15. The memory system according to claim 14, wherein the memory controller is configured to, after performing an operation based on the second command stored in the command buffer by using a region assigned to the host device based on the second descriptor stored in the descriptor buffer, fetch a third descriptor that is a same descriptor as the part of the first descriptor, which is overwritten by the second descriptor, from the host device, based on the stored first command, and store the fetched third descriptor in the descriptor buffer.

* * * * *